US007079160B2

(12) United States Patent
Colavin

(10) Patent No.: US 7,079,160 B2
(45) Date of Patent: *Jul. 18, 2006

(54) METHOD AND APPARATUS USING A TWO-DIMENSIONAL CIRCULAR DATA BUFFER FOR SCROLLABLE IMAGE DISPLAY

(75) Inventor: Osvaldo M. Colavin, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/909,817

(22) Filed: Aug. 2, 2004

(65) Prior Publication Data

US 2005/0001848 A1 Jan. 6, 2005

Related U.S. Application Data

(63) Continuation-in-part of application No. 09/920,026, filed on Aug. 1, 2001, now Pat. No. 6,801,219.

(51) Int. Cl.
*G09G 5/00* (2006.01)
*G06F 12/00* (2006.01)

(52) U.S. Cl. ...................................... 345/684; 345/564

(58) Field of Classification Search ................ 345/564, 345/569, 686, 674, 684, 672
See application file for complete search history.

(56) References Cited

U.S. PATENT DOCUMENTS 4,442,495 A 4/1984 Sukonick
4,445,114 A 4/1984 Stubben
4,794,386 A * 12/1988 Bedrij et al. ................ 715/803
4,829,493 A 5/1989 Bailey
5,006,837 A 4/1991 Bowers
5,032,907 A 7/1991 Isnardi
5,138,460 A 8/1992 Egawa
5,200,738 A * 4/1993 Fumoto et al. ............. 345/538
5,255,366 A * 10/1993 Chia et al. .................. 345/569
5,278,966 A 1/1994 Parks et al.
5,589,850 A * 12/1996 Lin et al. .................... 345/569
5,682,197 A 10/1997 Moghadam et al.
5,745,739 A * 4/1998 Wang et al. ................ 345/569
5,774,108 A 6/1998 Michiyoshi
5,798,749 A 8/1998 Minematsu et al.
5,929,927 A 7/1999 Rumreich et al.
5,940,641 A 8/1999 McIntyre et al.
6,072,507 A * 6/2000 Balatsos et al. ............ 345/569
6,078,306 A * 6/2000 Lewis ........................ 345/685
6,229,544 B1 5/2001 Cragun
6,366,295 B1 4/2002 Kurashina (Continued)

OTHER PUBLICATIONS

U.S. Appl. No. 09/476,652, filed Dec. 31, 1999, Mancuso et al.

(Continued)

*Primary Examiner*—Ryan Yang
(74) *Attorney, Agent, or Firm*—Stephen C. Bongini; Lisa K. Jorgenson

(57) ABSTRACT

A method and apparatus for buffering 2-dimensional graphical image data to be supplied to a scrolling display controller. A 2-dimensional, circularly addressed linear data buffer is used to store a portion of an entire image. The data buffer is larger than the amount of data displayed at one time. A user enters scrolling commands and the display scrolls around the data initially in the buffer. New data is loaded into the buffer as the displayed data approaches the edge of the buffered data.

22 Claims, 4 Drawing Sheets

U.S. PATENT DOCUMENTS

| | | | |
|---|---|---|---|
| 2002/0126126 | A1 | 9/2002 | Baldwin |
| 2002/0140829 | A1 | 10/2002 | Colavin et al. |
| 2002/0163512 | A1 | 11/2002 | Staudacher |

OTHER PUBLICATIONS

U.S. Appl. No. 09/477,036, filed Dec. 31, 1999, Mancuso et al.

U.S. Appl. No. 09/477,037, filed Dec. 31, 1999, Mancuso et al.

U.S. Appl. No. 09/477,117, filed Dec. 31, 1999, Mancuso et al.

U.S. Appl. No. 09/477,118, filed Dec. 31, 1999, Mancuso et al.

U.S. Appl. No. 09/477,919, filed Dec. 31, 1999, Mancuso et al.

* cited by examiner

METHOD AND APPARATUS USING A TWO-DIMENSIONAL CIRCULAR DATA BUFFER FOR SCROLLABLE IMAGE DISPLAY

CROSS-REFERENCE TO RELATED APPLICATIONS

This application is a continuation-in-part application of, and claims priority from application Ser. No. 09/920,026, filed Aug. 1, 2001, now U.S. Pat. No. 6,801,219. The entire disclosure of application Ser. No. 09/920,026 is herein incorporated by reference.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by any one of the patent documentation or patent disclosure, as it appears in the United States Patent and Trademark Office patent file or records, but otherwise reserves all copyright rights whatsoever.

BACKGROUND OF THE INVENTION

1. Field of the Invention

The present invention relates to memory management and display control techniques typically used in digital appliances such as Personal Digital Assistants (PDAs), Digital Still Cameras (DSCs), Personal Computers (PCs) and game consoles.

2. Description of Related Art

Electronic systems that display image data often contain a display that allows the user to view portions of a larger image object, and to scroll the viewing window to allow the user to view different portions of that object. Examples of such electronic systems include:

personal digital assistants, which because of their small screen, often display only a very small part of a whole image, such as a map;

digital still cameras, which may include a display using either an integrated display or attached monitor, that allow scrolling through a panorama picture or viewing of a photograph in zoom mode;

game consoles, where games often use a 2D textured background that scrolls as the user interacts with the game; and personal computers, where an "extended desktop" extends beyond the limits imposed by the physical screen size.

Electronic devices with scrolling image displays may integrate display features into a single integrated circuit. These integrated circuits are sometimes referred to as a system-on-chip (SoC). The SoC typically interface to the following additional elements:

a display device which receives a video signal, a combination of non-volatile memory (e.g. flash) and system memory (e.g. DRAM), and a number of input and output facilities in the appliance, such as buttons and step motors.

Internally, an SoC may include:

a CPU, which runs the software of the embedded application, a display DMA controller which reads, directly from memory, data defining pixels to be displayed and sending that data to a display processor which processes that data into a suitable video signal, an optional "block move" (a.k.a. 2D DMA) accelerator which accelerates the copying of rectangular areas from a source location in memory to a destination location in memory (these operations can be done in software at the cost of reduced performance), an I/O controller which interfaces with input and output devices, a memory controller which interfaces With external memory, a memory arbiter which arbitrates access to the memory between the various processes operating on the chip, other hardware acceleration blocks, such as a JPEG codec, and an "on chip bus" interconnecting all of the above.

In the operation of an electronic device with a scrolling display, the image to be displayed is either computed by the CPU or other dedicated hardware block included in the device, or it may be read directly from some other storage device, such as a flash memory. Once the image to be displayed is determined, the image is stored in system memory.

In the example of a digital still camera, the image is usually compressed and is typically read from flash memory, decompressed by the CPU or dedicated hardware, and stored in system memory. This stored image data in this example is then retrieved by a display Direct Memory Access (DMA) controller and is provided to a display controller. The display controller processes and formats the image data as required prior to output to the display device, such as a LCD or a TV.

The DMA controller in this example generates requests to the system memory arbiter to read data that defines the displayed image pixels. The arbiter grants the requests based on considerations such as memory availability and the relative priority of pending requests. When the DMA request is granted, the display DMA controller communicates pixel addresses to the memory controller, which generates the proper control signals to read the pixel data from system memory. Pixel data is usually retrieved in bursts of several pixels at a time in order to optimize memory bandwidth usage. The display controller typically stores the burst of retrieved data in a First In, First Out (FIFO) storage buffer for processing. The display controller then configures the DMA controller to read a new burst of data prior to exhausting the data within the FIFO.

Systems that have scrolling image displays that display a subset of a larger 2D graphics image generally utilize one of two techniques to buffer the image during scrolling.

A first technique, denoted herein as the "single-buffer" technique, is generally used in applications such as extended computer desktops. In the Single Buffer technique, the entire 2D graphics object is mapped into a contiguous segment of system memory. Scrolling is realized simply by changing the base address of the display buffer. The main drawback of this technique is that the size of the 2D graphics object is limited by the amount of system memory available to store the image.

A control program associated with the single-buffer technique first stores the entire 2D object in system memory. A control loop then starts which consists in sampling the user input and updating the display base address to implement scrolling. This simple control program is often merged into a more complex application specific program, e.g. there might be parallel processes that update the content of the 2D object. For example, in the "extended desktop" application, when the mouse pointer reaches the edge of the screen, the desktop scrolls to reveal an off-screen part of the desktop. Transfers of data into the buffer of a single image data buffer implementation are not required as a result of scrolling since the entire image is stored in the single data buffer.

A second technique, typically used with digital appliances or 2D game consoles, is referred to herein as the double-buffer technique. The double-buffer technique uses two buffers that are each the size required to store a frame of the image data that is displayed to the user. The entire 2D graphics object is not stored in system memory, only the portions of the image that is or is to be next displayed are stored in the buffer. One buffer is used as a display buffer while the second is used as the update buffer. The next scene is built in the update buffer while the display controller reads data from the display buffer. When the new scene is complete in the update buffer, the functions of the buffers are swapped; the display buffer becomes the update buffer and vice-versa. Simply toggling a data pointer between the two base addresses may be used to rapidly accomplish this switch.

The double-buffer method has several drawbacks. Some of these drawbacks are:

- successive scrolling scenes show largely overlapping portions of the 2D graphics object, therefore most of the same pixels are present in both buffers. This duplication of image data results in sub-optimal memory usage;
- a given pixel will be written repeatedly into the buffers, at different locations, as long as it is present in the displayed scene. This repeated writing of data into the buffers results in memory bandwidth waste and its corollaries: power waste and system performance degradation;
- before the new scene can be built, user input regarding scrolling direction must be known, which can result in slow response time.

A simpler version of this technique uses just one buffer. The new scene in this simpler version is constructed in the same buffer as is used for display. Apart from the smaller memory footprint, it retains all the drawbacks of the double-buffering technique, while adding the drawback of a less elegant user interface. If the update process takes more time than display vertical refresh period, the user of a device with this simpler version will see artifacts, such as image tearing, on the display during an update because the new scene is being written over the previous scene that is in the same display buffer.

The control program that implements the double-buffering technique first builds the initial scene in one of the buffers, buffer A for example. Buffer A is then used as the display buffer. A control loop then begins that samples user input and based on user input concerning scrolling direction, the next scene is built in another buffer, e.g. buffer B. While the new scene is being built, which can take some time, user inputs must be ignored or queued, in both cases the user does not perceive any response to her inputs. When the new scene is ready, the functions of the buffers are swapped, buffer B becomes the display buffer and buffer A becomes the update buffer.

Therefore a need exists for a technique that circumvents all the above-described drawbacks by providing simultaneously:

- low power operation by writing a given pixel only once to system memory, instead of many times,
- low memory footprint, by avoiding the storage of the entire 2D graphics object in system memory and the duplication of pixels in memory
- good system performance by minimizing memory bandwidth usage
- good response time by anticipating user input

SUMMARY OF THE INVENTION

The present invention provides a system and method for buffering and accessing image data. The present invention stores image data in a buffer that acts as a display buffer and that is larger than the data that is displayed at a given time. The buffer therefore retains a rectangular portion of the 2D graphics object that is larger than the rectangular portion currently being displayed. The present invention also provides a novel and efficient method and apparatus to store and retrieve the data within the buffer.

BRIEF DESCRIPTION OF THE DRAWINGS

The subject matter that is regarded as the invention is particularly pointed out and distinctly claimed in the claims at the conclusion of the specification. The features and advantages of the invention will be apparent from the following detailed description of example embodiments that are taken in conjunction with the accompanying drawings.

DESCRIPTION OF THE PREFERRED EMBODIMENTS

The present invention, according to a preferred embodiment, overcomes problems with the prior art by providing a system and method of using a two dimensional, circular buffer to buffer data for an image data display while increasing the efficiency of memory utilization and data transfers.

The drawings accompanying this specification use like numerals to refer to like parts throughout the several views. However, it should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

The present invention, as is shown in the illustrated embodiments, provides a system and method for buffering and accessing image data. The example embodiments of the present invention store image data in a portion of memory that acts as a display buffer cache and that is larger than the data that is displayed at a given time. The display buffer cache in this embodiment therefore retains a rectangular portion of a 2D graphics object that is larger than the rectangular portion currently being displayed. The present invention also provides an efficient method and apparatus to store and retrieve the data within the display buffer cache.

Figure 1:
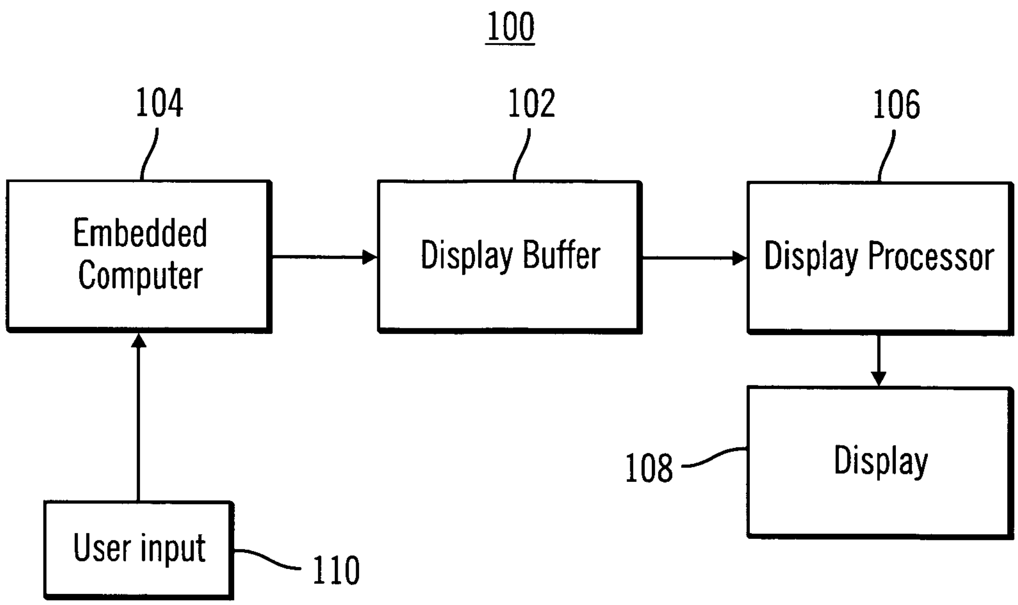
FIG. 1 is a block diagram of the elements of an example system embodying the present invention.

The relevant components 100 of an exemplary embodiment of the present invention are shown in FIG. 1. Systems that embody the present invention may also incorporate elements beyond that shown in FIG. 1, such as elements which will produce images to be displayed. The elements shown in FIG. 1 include a display buffer cache 102 that is accessed by a display processor 106. The display processor 106 incorporates hardware that accesses a subset of the display buffer cache 102 in order to retrieve the subset of data contained within the display buffer cache 102 that comprises the display buffer. The display buffer contains only the data that is currently being displayed by the device. The display processor 106 performs the processing necessary to display an image on display 108. The exemplary embodiment of FIG. 1 also has an embedded computer 104 that determines and monitors changes in the scroll position of the image and determines additional image data to be stored in the display buffer cache 102. The example embodiment of FIG. 1 further incorporates User Input device 110 that at least allows a user to change the portion of an image shown on display 108.

Figure 2:
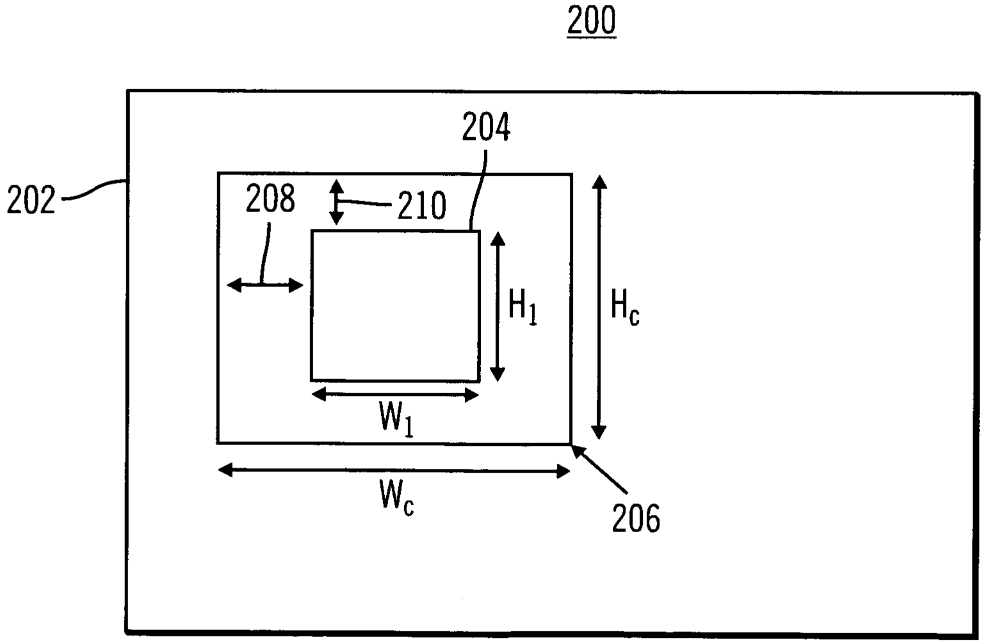
FIG. 2 is an illustration of an entire set of image data and the subsets of that data that are buffered and displayed by the illustrated embodiments of the present invention.

FIG. 2 illustrates the various image segments 200 used by the illustrated embodiments and the relationships among those segments. FIG. 2 shows the entire 2D graphics object that is the complete set of digital image data 202 from which the example embodiments obtain subsets of image data to be displayed. The example embodiments use a buffer that stores a subset of the complete set of digital image data 202. That buffer, which is referred to herein as the display buffer cache 102, stores a buffered subset of image data referred to herein as the cached image data 206.

The cached image data 206 consists of a number of pixel data contained in the complete set of digital image data 202. The cached image data 206 contains $H_c$ rows of image data that each contains $W_c$ pixels of data (i.e. each row is $W_c$ pixels long).

The illustrated embodiments of the present invention display a subset of the cached image data 204 contained in the display buffer cache 102. The data actually displayed at a given time is referred to herein as the "display buffer" 204. The display buffer 204 is shown in FIG. 2 to have $H_1$ rows which each have $W_1$ pixels. The left edge of the display buffer 204 is shown to be a left distance dimension 208 from the corresponding edge of data forming the cached image data 206. The top edge of the display buffer 204 is also shown to be top distance dimension 210 from the corresponding edge of data forming the cached image data 206. The left distance dimension 208 is measured in the example embodiment as a number of Pixels between the two edges of data subsets, and the top distance dimension is measured therein as a number of rows. The corresponding edge in this context is the nearest edge of the data subsets when shown as a two-dimensional image. A right distance dimension and bottom distance dimension can be similarly measured. These distances are used by some embodiments to determine when to update the data within the display buffer 102.

The rows of image data discussed above are linear segments of the image stored in the set of digital image data 202. These rows in the exemplary embodiment generally correspond to pixel rows that are displayed to a user. It is clear that further embodiments of the present invention are able to utilize linear segments of image data that correspond to columns or other lines within the digital image data 202.

How the 2D graphics object that is the complete set of image data 202 is created and stored is system and application dependent. A more complex example might be a display of a photographic panorama that is actually composed of several pictures that are each compressed in the JPEG format and stored in flash memory. As a user scrolls through the panorama, compressed pictures will have to be read from the flash memory and decoded into system memory before they can be copied into the display buffer cache 102. Practitioners with average skill in the relevant arts are able to develop these and other methods to retrieve, process and produce the image data to be displayed by the illustrated embodiments.

Exemplary embodiments of the present invention are designed to use a display buffer cache 102 that is larger than the display buffer 204. The user of the exemplary embodiment may change the section of the image data that is within the display buffer cache 102 to be displayed by "scrolling" the display buffer 204 within the cached image data 206 stored in the display buffer cache 102. Exemplary embodiments of the present invention monitor user inputs that specify the direction in which the display buffer 204 is to be scrolled. The user may specify that the display buffer 204 be moved in one of four directions: Up, Down, Left or Right. Movement in orthogonal combinations of these directions is also possible. The design of user interfaces for this input is known in the relevant arts. As user inputs direct scrolling in a particular direction, the display buffer 204 will be reconfigured so as to add image pixels in the direction of the scroll, and remove pixels from the opposite direction. As an example, a user command to scroll leftward results in image pixels being added to the left of the display buffer 204 and image pixels therefore being removed from the right side to make room for the new, left side pixels.

In processing the scroll commands, example embodiments change the base address of the display buffer 204 within the display buffer cache 102. These example embodiments utilize a display buffer cache 102 that is larger than the display buffer 204 which allows some scrolling to occur prior to loading new data into the display buffer cache 102. The display buffer cache 102 is thereafter updated with new data as the user scrolls over the 2D graphics object, although this update is not necessarily performed for each scroll increment. The display buffer cache 102 of example embodiments is updated only when one edge of the display buffer 204 becomes sufficiently close to the edge of the rectangle of the cached image data 206 that is stored in the display buffer cache 102. The display buffer update in the example embodiment is performed by replacing pixels stored in the display buffer cache 102 that are furthest away from the display buffer 204 with new pixels that are on the opposite side of display buffer 204. This action has the effect of maintaining the display buffer 204 effectively in the center of the rectangle of image data stored in the display buffer cache 102.

The part of the display buffer cache 102 that is updated by these example embodiments is always "off-screen," which means that the updating is performed on data that is outside of the data window currently being displayed. This results in update processing that does not interfere with the image currently displayed.

Updating of the display buffer cache 102 may be performed as a background process since the display buffer cache 102 is usually updated before the new image data is actually needed by the display processor 106. Performing display buffer cache updates in the background allows scrolling control to return to the user as soon as the update is initiated. This improves the system's response time that is perceived by the user. Once control is returned to the user, more scrolling increments can be performed immediately even if the earlier update is not completed. The system designer may select a number of design characteristics to optimize system operation. A designer may select the size of the display buffer cache 102 and how "close" the edge of display buffer 204 has to be to the edge of data in the display buffer cache 102 before an update is to be started. Other characteristics that may be selected in design include how much of the display buffer cache 102 is updated and which part of the display buffer cache 102 is to be updated first. The system designer can minimize the occurrence of the display buffer 204 reaching the edge of the buffered data before an update is completed through proper selection of design characteristics. This would ensure a smooth image scrolling experience for the user.

The example embodiments of the present invention incorporate a change in the display buffer memory addressing utilized by a single buffer implementation. The example embodiments of the present invention are similar to a single buffer implementation. Differences in these embodiments lie in the size of the display buffer cache 102, how the display buffer cache 102 is addressed, and how the display buffer cache 102 is maintained. The display buffer cache 102 in the example embodiments of the present invention contains only a portion of the image and is therefore smaller than the single buffer implementation, which stores the entire image. The example embodiments address the display buffer cache 102 by implementing a form of circularity and those display buffer caches 102 occasionally require updating in response to scrolling. The single buffer implementation does not use circular addressing and does not need to be updated. Moreover, example embodiments of the present invention are compatible with prior art single buffer implementations because they may be operated in a mode that behaves like those systems.

The example embodiments of the present invention use circular addressing techniques to accommodate display buffer caches 102 that are smaller than the entire 2D graphics object which forms a complete set of digital image data. The circular addressing used by the example embodiments result in scrolling operations that are seamless to the user and, to a certain extent, to the programmer.

Figure 3:
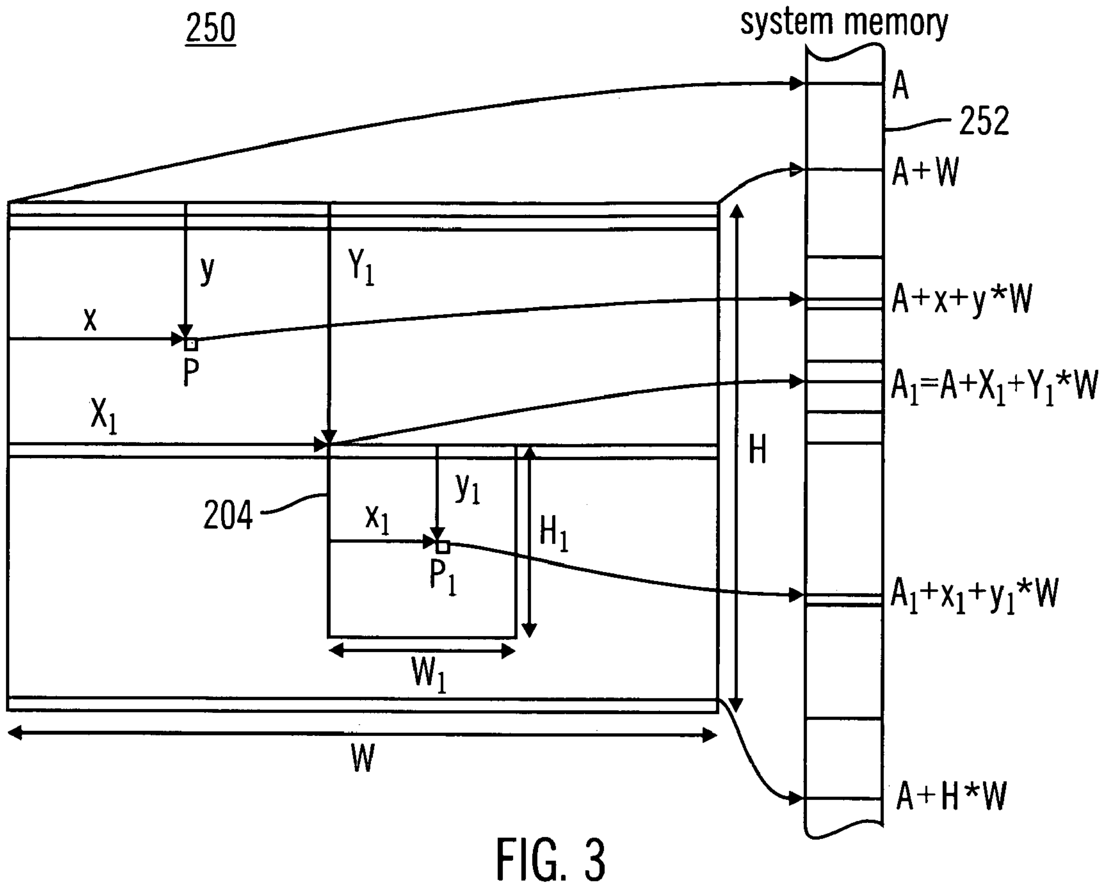
FIG. 3 is an illustration of the mapping of two dimensional image data into one dimensional system memory storage.

FIG. 3 illustrates the pixel mapping 250 which shows how pixels of an example 2D graphic image are mapped into the 1 D system memory address space of the system memory 252 of an example embodiment. In the example embodiment reflected by pixel mapping 250, the cached image data is stored in system memory 252. In the following example description of the calculation of these pixel addresses, it is assumed that pixels are 1 byte wide in order to facilitate presentation of the formulas. These example formulas can be easily extended for the cases where pixels are smaller or larger.

An example rectangular 2D graphics object 256 of width W pixels and height H pixels is stored in system memory 252. It will occupy a contiguous memory space from a base address A to address A+W*H−1. Pixel P of coordinates (x, y) relative to the top-left corner of the 2D graphics object will be located at byte address:

$$A(P)=A+x+y*W \quad (1)$$

An example rectangular region 204 within this entire 2D graphics object 256 is characterized by an upper left corner at coordinates $(X_1,Y_1)$, a width of $W_1$ pixels and a height of $H_1$ pixels. According to formula (1), this rectangular region starts at address $A_1=A+X_1+Y_1*W$ in system memory, but does not occupy a contiguous memory space. A pixel $P_1$ of relative coordinates $(x_i,y_i)$ inside the rectangular region will have an address:

$$A(P_1)=A+(X_1+x_1)+(Y_1+y_1)*W \quad (2)$$

or, $$A(P_1)=A_1+x_1+y_1*W \quad (3)$$

The similarity of formulas (1) and (3) allows the use of the same address generating hardware to access a whole 2D graphics object occupying a contiguous memory space, or only a rectangular portion of this object that occupies a non contiguous memory space.

The size of the display buffer cache 102 is independent of the size of the entire 2D graphics object that forms the complete set of digital image data 256. This allows objects of arbitrary size to be viewed using an embodiment of the present invention. The size of the display buffer cache 102 is determined in part by system considerations. It can be determined strictly by the amount of memory available in the system, or it can be determined by the response time required by the system. More memory generally improves the response time because display buffer cache updates can be anticipated earlier.

In exemplary embodiments of the present invention, there is no wasted memory because pixels are not duplicated in the linear buffer memory. The single display buffer cache 102 can be smaller that the two buffers used in a double buffering technique, it can be the same size or it can be even larger for better performance. This technique therefore gives the system designer several design choice trade-offs to balance cost and performance.

Another advantage of the example embodiments of the present invention is that pixels that are present in successive scenes are written into the display buffer cache 102 only once. This results in significantly reduced power dissipation over a double buffering technique. System performance is also improved because writing to fewer memory locations reduces memory bandwidth requirements. Another advantage is that scrolling response time is immediate because the pixels for the next scene are already in the display buffer cache 102 due to background display buffer cache updating.

In the circular buffering utilized by an embodiment of the present invention, a pixel P(x, y) of a complete set of cached image data 256 is mapped into the display buffer cache 102 according to the following formula:

$$A_c(P)=A+(x+y*W_c) \bmod S_c \quad (4)$$

Where A is the base address of the display buffer cache 102 in system memory, $W_c$ is the width of the display buffer cache 102 in bytes, and $S_c$ the size of the display buffer cache 102 in bytes.

The address of a pixel $P_1(X_1+x_1,Y_1+y_1)$ within the display buffer cache 102 of the exemplary embodiment, Where $(X_1,Y_1)$ are the absolute coordinates of the top-left pixel of the display buffer 204, and $(x_1,y_1)$ are the relative coordinates of P1 in the display buffer 204, is therefore:

$$A_c(P_1)=A+((X_1+x_1)+(Y_1+y_1)*W_c)\bmod S_c$$

$$A_c(P_1)=A+((X_1+Y_1*W_c)+x_1+y_1*W_c)\bmod S_c$$

$$A_c(P_1)=A+(A_1+x_1+y_1*W_c)\bmod S_c \quad (5)$$

Where $$A_1=X_1+Y_1*W_c \quad (5a)$$

Formula (5) is also equivalent to:

$$A_c(P_1)=A+((A_1 \bmod S_c)+x_1+y_1*W_c)\bmod S_c \quad (6)$$

Rewritten for short $$A_c(P_1)=A+A_0 \bmod S_c \quad (6)$$

The result of equation (6) is advantageously used by the exemplary embodiment because ($A_1$ mod $S_c$) requires fewer data bits than $A_1$ when $A_1>S_c$. It also has the advantage of simplifying the modulo operator hardware as explained below. Because the display buffer 204 of the exemplary embodiments is smaller than the display buffer cache 102, the following expression is always true:

$$x_1+y_1*W_c<S_c$$

and since:

$$(A_1 \bmod S_c)<S_c$$

we have:

$$A_0=(A_1 \bmod S_c)+x_1+y_1*W_c<2S_c \quad (7)$$

Figure 6:
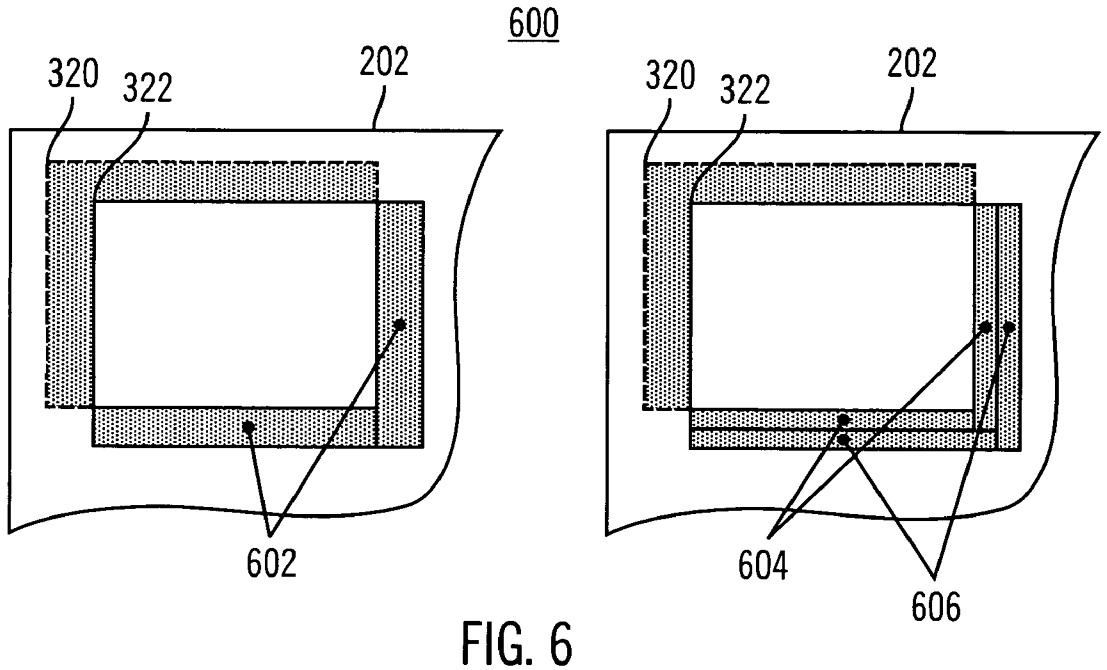
FIG. 6 is a block diagram of an example processor that calculates display buffer addresses according to an aspect of the present invention.

Formula (7) leads to an implementation of the modulo operation that is illustrated in FIG. 6 and expressed by the formula:

$$\text{if } A_0<S_c, (A_0 \bmod S_c)=A_0, \text{ else, } (A_0 \bmod S_c)=A_0-S_c \quad (8)$$

It is to be noted that the modulo function referred to in the above discussion have the function of reducing the magnitude of the term in front of the "mod" function by the value of the term after the "mod" function if the magnitude of the term in front of the "mod" function is greater than the term after the "mod" function.

The above descriptions describe the processing performed by the exemplary embodiment, which uses a buffer base address to which positive offsets are added to determine a particular pixel address. Further embodiments of the present invention have a buffer structure whereby a pixel address is determined by essentially subtracting an offset from the buffer base address. This subtraction can occur, for example, by performing the equivalent of adding negative offsets to the buffer base address. The operation of these further embodiments is clear in light of the present discussion.

Figure 4:
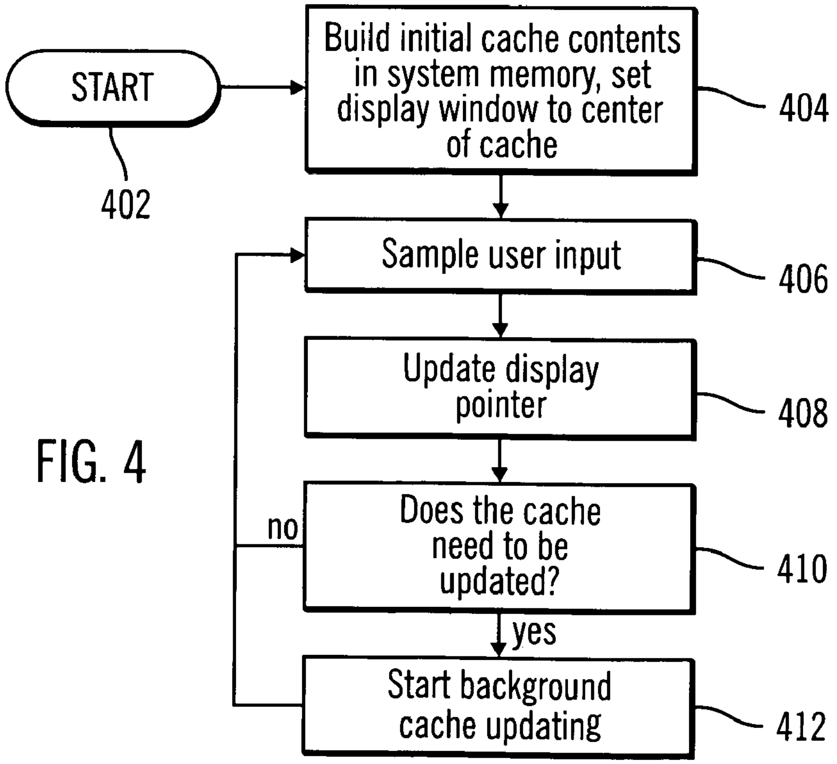
FIG. 4 is a processing flow diagram illustrating the processing associated with scrolling functions implemented in an example embodiment of the present invention.
Figure 5:
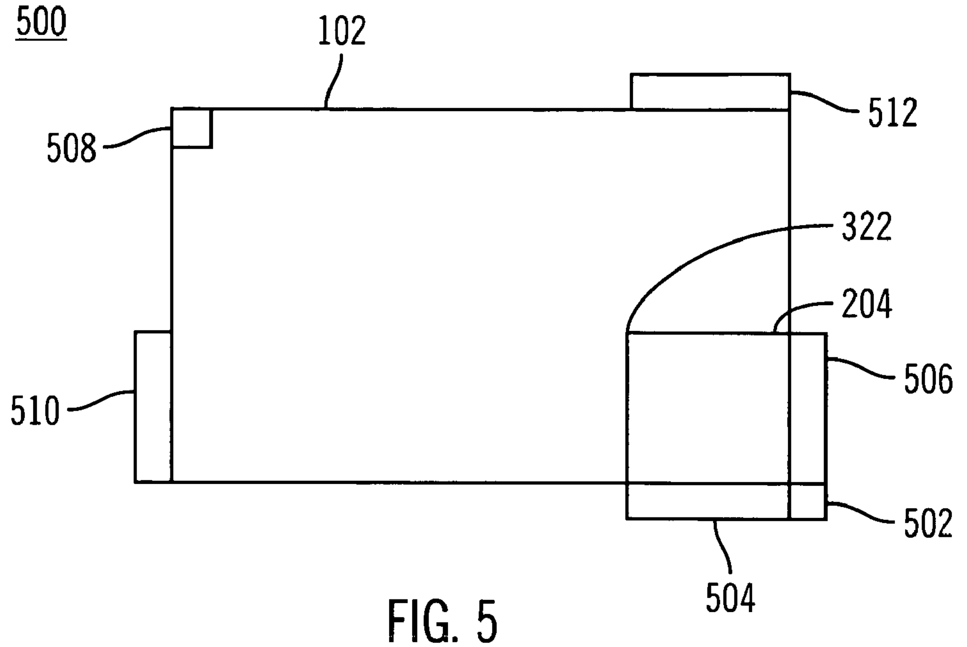
FIG. 5 is an illustration showing alternative methods for updating a display buffer that may be used by different embodiments of the present invention.

FIG. 4 depicts the illustrated embodiment's control flow 400 for the program segment of an example embodiment that interacts with a user's scrolling over the 2D graphics object. The processing starts with step 402 and progresses to the initialization processing in step 404. As part of initialization processing, the example embodiment allocates memory to the display buffer cache 102 and the display buffer cache 102 is filled with a default rectangular subset of the 2D graphics object 202. Some embodiments may use a simple block move operation to fill the display buffer cache 102.

Processing then continues by entering the user scrolling interaction loop. The control program of the example embodiment then monitors, in step 406, the user scrolling input, which is input by a user input device 110 in an example embodiment. In response to user scrolling input, the display buffer 204 scrolls (is moved) within the display buffer cache 102 in step 408. The "scrolling" is implemented in this example embodiment by changing the starting location of the display buffer 204 location in the linear buffer memory. Processing then continues to step 410 to determine if the data in the display buffer cache 102 is required to be updated. At the beginning of operations, no display update is generally necessary because there is enough data in the display buffer cache 102 to guarantee a correct operation for some amount of time. If no update is required, the processing loop continues with step 406 where user scrolling input is again sampled.

As the display buffer 204 is scrolled, however, the edge of the display buffer 204 approaches an edge of the cached image data 206 stored in the display buffer cache 102. The processing thereby anticipates that data not yet present in the display buffer cache 102 will be needed. As the distance between the edge of the display buffer 204 and the data in the display buffer cache 102 decreases below a threshold, the processing of step 410 determines that a display buffer cache 102 update is required. Processing continues with step 412 to begin background processing of the display buffer cache updating. Because the edge of the display buffer 204 has not yet reached the edge of the display buffer cache 102, there is generally still enough data in the display buffer cache 102 to continue a correct scrolling operation. Processing then continues with step 406 to process further user scrolling commands. The threshold distance below which an update must be started is dependent upon the size of the display buffer cache 102 and upon the time the update takes. The proper threshold below which an update to the display buffer cache 102 should be initiated should optimally be established for each system and application.

One way to determine the distance to the edge (De) below which an update must be started is to consider that the time to update the buffer must be smaller than the time for the user to reach the edge of the buffered data by scrolling. This is represented by the following inequation:

Ku.Su<Ks.De, where

De is the critical distance between the edge of the display buffer 204 and the edge of the cached image data 206 display buffer cache 102, in pixels, Ks is an application dependant constant characterizing the maximum scrolling speed, in pixels/second, and Ks.De is therefore the shortest time the user will take to scroll to the edge of the data currently stored in the display buffer cache, Su is the size of the updated zone in bytes, Ku is a system dependant constant in bytes/second, characterizing the speed at which the system can transfer data in the display cache buffer, and Ku.Su is therefore the time the system will take to update the display buffer cache FIG. 6 illustrates updating of a display buffer cache 102 by a buffer update. FIG. 6 shows the subset of data being stored in the buffer being changed so that the upper left corner of the subset moves from location 320 to location 322 within the complete set of digital image data 202. The portion of the display buffer cache 102 that is overwritten by the update process is the portion that contains data for pixels that are furthest away from the display buffer 204. In the general case, the update can be achieved with 2 block move operations as is shown by the two data areas 602. If, however, the scroll direction is only horizontal or vertical, then only one block move may be required. FIG. 6 shows how the buffer may be updated by alternative embodiments that update the display buffer cache 102 in sections. This operation may be used to increase system performance. These alternative embodiments first move close pixels 604 into the display buffer cache 102, then further pixels 606 are moved into the display buffer cache 102. The pixels illustrated in buffer 600 in the example embodiments are actually transferred into a circularly addressed buffer and may not be contiguous in the buffer address space as is shown in FIG. 6.

Figure 7:
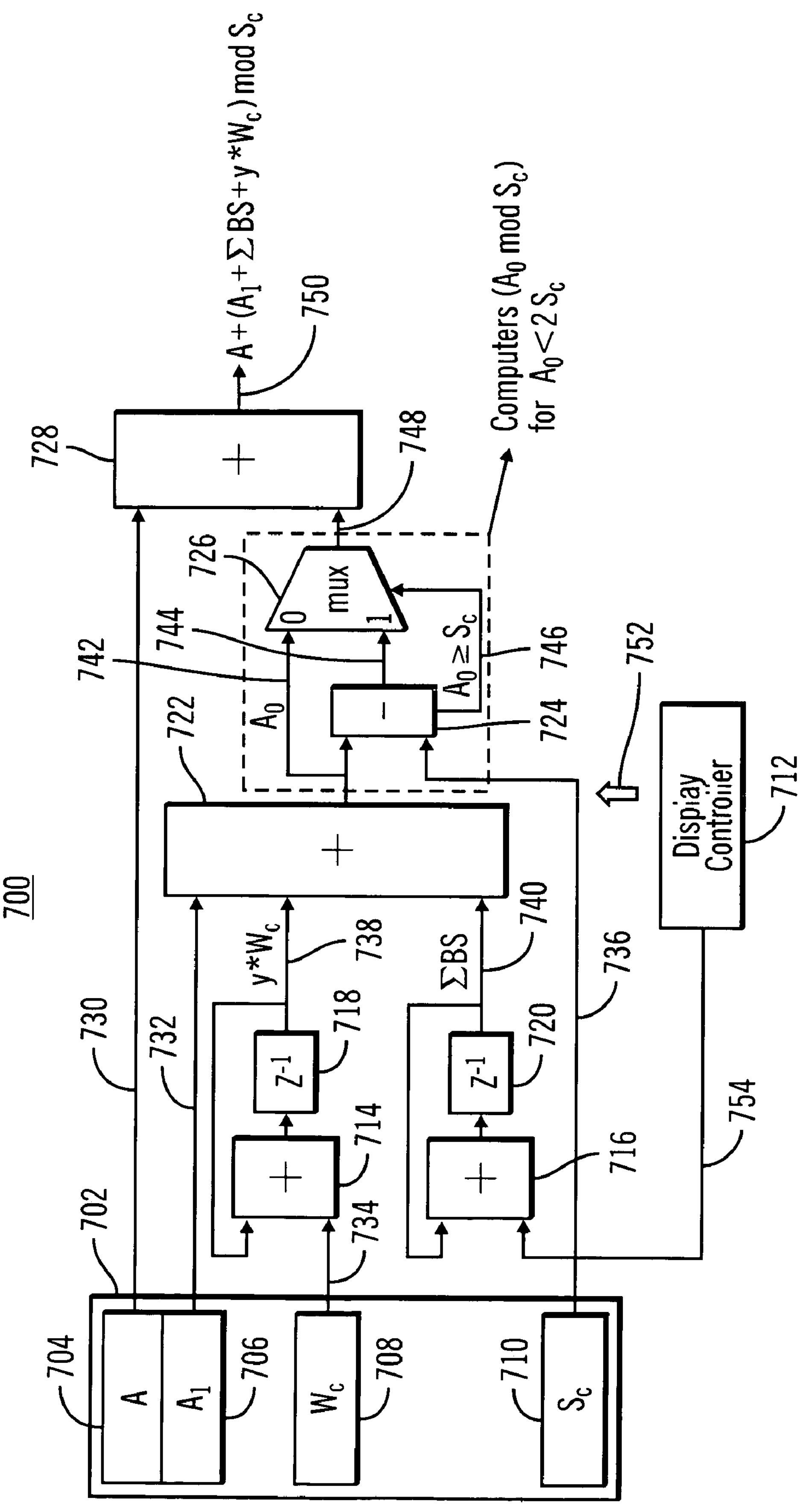
FIG. 7 is a block diagram of an example processor that calculates addresses of pixels stored within the display buffer cache of FIG. 1 in an embodiment of the present invention.

FIG. 7 is a block diagram of an example processor 700 that calculates addresses of pixels stored within the display buffer cache 102 in an embodiment of the present invention. The example processor 700 is used in an embodiment of the present invention to calculate the starting addresses of a block of data to be loaded into a First In, First Out (FIFO) buffer of a video display controller. The processor 700 is designed to calculate the starting addresses of a series of burst data blocks. The processor comprises the following components.

A register block 702 that contains several registers that may be configured by external components and which control the operation of the processor 700.

A register A 704 that holds and outputs the base address 730 within system memory of the display buffer cache 102.

A register $A_1$ 706 whose contents and output value 732 correspond to the position of the top-left corner of the display buffer 204 according to formula (5a) modulo $S_c$, where $S_c$ is the size of the display buffer cache 102.

A register $W_c$ 708, whose value 734 corresponds to the width in bytes of the cached image data 206.

A register $S_c$, 701 whose value corresponds to the size in bytes of the display buffer cache 102, which is also the size of the cached image data 206, $S_c = H_c * W_c$.

A first accumulator 714 used to calculate an offset value $(y*W_c)$ 738 for each new display line. The first accumulator is reset to zero at the beginning of each new display frame and performs a new calculation at the beginning of each display line. First accumulator in this example embodiment uses a first delay element 718 to store the prior output of the accumulator 714 in order to compile a running sum of prior outputs and $W_c$ and display line lengths $W_c$.

A second accumulator 716 that calculates a pixel row position 740, which is a number of pixels past the start of the displayed line of the beginning of the burst data to be retrieved. The value of the second accumulator 716 is reset to zero at the beginning of each new display line and performs a new calculation for each new burst, by accumulating successive burst lengths. The length of burst data read is provided by display controller 712 and corresponds to the amount of data loaded into the FIFO buffer within the display controller 712.

A first 3-input adder 722 used to compute a sum of the contents of register $A_1$ 730, the contents of the first accumulator 714 and the second accumulator 716. The first 3-input adder has an output $A_0$ 742.

A modulus calculating block comprising difference operator 724 and mux (data multiplexer) 726. The inputs of the modulus calculating block are driven by the output of the first 3-input adder 722 and the value contained in register $S_c$ 710. The modulus calculating block 724 computes ($A_0$ mod $S_c$), according to formula (8) and produces output 748.

A final 2-input adder 728 that adds the contents of register A 704 to the output 748 of the modulus operator.

The above describes one particular implementation of a circular addressing scheme as described by formula (4). Other formulas can be used and will lead to slightly different implementations of the address generation. One such formula is the following:

$$A_c(P)=A+(x \bmod W_c)+(y \bmod H_c)*W_c$$

The processor 700 is initialized after the display buffer cache 102 has been allocated in system memory. The processor is configured to properly process the data in the display buffer cache 102 by having the parameters of the display buffer cache 102 programmed into control registers 702. The display buffer cache base address is loaded into register A 704, The cached image data width is loaded into register $W_c$ 708, and the display buffer cache size is loaded into register $S_c$ 701.

Processing then continues by downloading a portion of a 2D graphical object into the display buffer cache 102. Register A1 706 is loaded with a value corresponding to the memory address of the top-left corner pixel of the display buffer 204. Operation of the display controller is then started, and scrolling input from the user is processed as is illustrated in FIG. 4.

The example embodiments have the advantage that the complex details of the display buffer addressing are hidden from the application program. The application processes image data of the 2D graphics object using coordinates of that object. The address to which image data is written into the display buffer 102 by the application program is simply the modulus of the address which would be used if the object was entirely mapped in system memory and the size of the cached image data 206.

Alternative embodiments of the present invention may include a block move (or 2D DMA) processing component. This component allows the control program with a single command, to move efficiently rectangular areas of a 2D image from one part of memory to another. In this context it would be used to update the display buffer cache 102. That block move processing component uses the same addressing technique to write to the display buffer cache, thereby allowing the application to issue block move commands in coordinate space of the 2D graphics object. Further, although mathematically manipulations of rows are shown for the linear buffer, it is within the true scope and spirit of the present invention, as understood to those of average skill in the art to use columns or other linear segments instead of rows, and/or using a base address for the row or column and a positive or negative index for addressing into the buffer. Further embodiments of the present invention utilize a base address and negative indexes that are created by, for example defining the row length to be negative.

A further advantage of the example processor 700 is that the same processor could be utilized within a prior art single buffer system by setting registers $A_1$ and $S_c$ to 0. This feature is particularly beneficial for implementations using, for example, a single or a small number of integrated circuits that could be used to implement the present invention or to implement prior art systems.

The present invention can also be used in a system where scrolling occurs not over the entire display screen, but only within a window covering a portion of the display screen. The present invention may also be employed in a system wherein the entire screen is scrolled except for some overlay graphics objects which appear within a fixed region of the screen. In that case, the display buffer must be defined outside of the display buffer cache. The display buffer cache is still managed and updated as described above, but additional steps are required to compose the display buffer, each time a change occurs, from the display buffer cache and from the additional data required to compose the final displayed image. In particular, scrolling is realized by moving the appropriate data from the display buffer cache to the display buffer by one or more block move operations.

The present invention may be utilized in a wide variety of products. Example products include a digital camera which digitally stores a captured image with a display that allows the user to zoom into the image. The display of the digital camera will only display a portion of the entire image stored within the camera, and the present invention may be used to more efficiently scroll the image on the display. Further examples include video movie camera, personal computers, wireless communications devices or any communications device. A communications device could receive a digital image for any purpose and allow the user to scroll the image on a display.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method of calculating a pixel address within a two dimensional data buffer, wherein the pixel is characterized by a linear segment position and a linear segment number in the data buffer, and wherein the two dimensional data buffer is characterized by a linear segment length and a buffer size, the method comprising calculating a linear segment offset within a two dimensional data buffer by multiplying a linear segment number by a linear segment length calculating a raw address by adding a two dimensional display buffer starting data address modulo the data buffer size, a pixel linear segment position and the linear segment offset; and in response to the raw address having a magnitude greater than the data buffer size, then reducing the magnitude of raw address by the buffer size.

2. The method according to claim 1, wherein the linear segment offset is one of a positive value and a negative value.

3. A system for calculating a pixel address within a two dimensional data buffer, wherein the pixel is characterized by a linear segment position and a linear segment number in the data buffer, and wherein the two dimensional data buffer is characterized by a linear segment length and a buffer size, the system comprising:

a linear segment offset calculator, for calculating a linear segment offset within a two dimensional data buffer, wherein the linear segment offset calculator multiplies a linear segment number of a pixel by a linear segment length of a two dimensional data buffer;

a raw address calculator, electrically connected to the linear segment offset calculator, wherein the raw address calculator adds a two dimensional display buffer starting data address modulo the data buffer size, a linear segment position of the pixel and the linear segment offset; and a modulo operator, electrically connected to the raw address calculator, wherein the modulo operator reduces the magnitude of the raw address by the buffer size if the raw address has a magnitude greater than the data buffer size.

4. The system according to claim 3, wherein the linear segment offset is one of a positive value and a negative value.

5. A computer program product for calculating a pixel address within a two dimensional data buffer, wherein the pixel is characterized by a linear segment position and a linear segment number in the data buffer, and wherein the two dimensional data buffer is characterized by a linear segment length and a buffer size, the computer program product configured to perform the steps of:

calculating a linear segment offset within the two dimensional data buffer by multiplying a linear segment number by a linear segment length calculating a raw address by adding a two dimensional display buffer starting data address modulo the data buffer size, a pixel linear segment position and the linear segment offset; and in response to the raw address having a magnitude greater than the data buffer size, reducing the magnitude of the raw address by the buffer size.

6. The computer program product according to claim 5, wherein the linear segment offset is one of a positive value and a negative value.

7. A method for buffering a subset of digital image data used to drive a scrolling display, the method comprising:

storing a first contiguous data subset of a complete set of digital image data into a linear buffer memory, the data subset being greater than an amount of data accessed by a display and the buffer memory being organized as a two dimensional circular buffer;

determining if a display buffer within the first contiguous data subset is within a threshold distance of an edge of data forming the first contiguous data subset;

identifying an additional subset of the complete set of digital image data to place into the buffer memory, wherein the additional subset is image data that is contiguous with the first contiguous data and wherein the additional subset of data extends beyond the edge of the first contiguous data subset; and loading the additional subset of data into the display buffer beyond the edge of the first contiguous data subset through circular addressing of the display buffer, wherein the buffer memory stores a plurality of pixels, each of the plurality of pixels having a pixel address within the buffer memory, wherein each pixel is characterized by a linear segment position and a linear segment number within the linear buffer memory, and wherein the buffer memory is characterized by a linear segment length and a data buffer size, wherein a selected pixel is access by:

calculating a linear segment offset within the buffer memory by multiplying a linear segment number of the selected pixel by the linear segment length;

adding a buffer memory starting data address, modulo the data buffer size, to a selected linear segment position of the selected pixel, and adding that sum to the linear segment offset; and reducing a magnitude of the linear segment offset by the data buffer size if the magnitude of the linear segment offset is greater than the data buffer size.

8. The method according to claim 7, wherein the linear segment offset is one of a positive value and a negative value.

9. A method according to claim 7, wherein the loading the additional subset of data comprises progressively loading the additional subset of the complete set of digital image data into the buffer.

10. A system for buffering a subset of digital image data used to drive a scrolling display, comprising:

a display buffer cache for storing a first contiguous data subset of a complete set of digital image data, the data subset being greater than an amount of data accessed by a display and the display buffer cache being organized as a two dimensional circular buffer; and a scrolling controller, electrically connected to the display buffer cache, which performs the following processing:

determining if a display buffer within the display buffer cache is within a threshold distance of an edge of data forming the first contiguous data subset;

identifying an additional subset of the complete set of digital image data to place into a linear buffer memory, wherein the additional subset is image data that is contiguous with the first contiguous data and wherein the additional subset of data extends beyond the edge of the first contiguous data subset; and loading the additional subset of data into the display buffer beyond the edge of the first contiguous data subset through circular addressing of the display buffer, wherein the display buffer cache stores a plurality of pixels, each of the plurality of pixels having a pixel address within the two dimensional circular buffer, wherein each pixel is characterized by a linear segment position and a linear segment number with the linear buffer memory, and wherein the two dimensional circular buffer is characterized by a linear segment length and a data buffer size, wherein a current pixel is access by:

calculating a linear segment offset within the two dimensional circular buffer by multiplying a linear segment number of the current pixel by the linear segment length;

adding a two dimensional circular buffer starting data address, modulo the data buffer size, to a current linear segment position of the current pixel, and adding that sum to the linear segment offset; and reducing the magnitude of the linear segment offset by the data buffer size if the magnitude of the linear segment offset is greater than the data buffer size.

11. A system according to claim 10, wherein the scrolling controller progressively loads the additional subset of the complete set of digital image data into the buffer.

12. The system according to claim 10, wherein the linear segment offset is one of a positive value and a negative value.

13. The system according to claim 10, wherein the display buffer cache comprises:

a register A for storing a base address for image data to be displayed;

a register A1 for storing a position of a top-left corner of the image data to be displayed;

a register Wc for storing the linear segment length;

a register Sc for storing a size of the image data to be displayed;

a first accumulator, communicatively coupled to the register Sc, for accumulating an offset value for each display line, wherein the first accumulator comprises a first delay element for storing a prior output of the first accumulator in order to compile a running sum of prior outputs of the first accumulator;

a second accumulator for calculating the current linear segment position;

a 3-input adder, communicatively coupled to the register A1, the first accumulator and the second accumulator, for computing a sum of values stored in the register A1, the first accumulator and the second accumulator;

a modulus calculator, communicatively coupled to the first 3-input adder and the register Sc, for calculating the modulus of the value stored in the register Sc and an the sum of values stored in the register A1, the first accumulator and the second accumulator; and a 2-input adder for adding values stored in the register A and an output of the modulus calculator.

14. A device incorporating a video display, comprising:

image display for displaying a video image defined by a display buffer;

a display buffer cache, electrically connected to the image display and for storing a first contiguous data subset of a complete set of digital image data, wherein the data subset is larger than display buffer and the display buffer cache is organized as a two dimensional circular buffer; and a scrolling controller, electrically connected to the display buffer cache, which performs the following processing:

determining if a display buffer within the display buffer cache is within a threshold distance of an edge of data forming the first contiguous data subset;

identifying an additional subset of the complete set of digital image data to place into a linear buffer memory, wherein the additional subset is image data that is contiguous with the first contiguous data and wherein the additional subset of data extends beyond the edge of the first contiguous data subset; and loading the additional subset of data into the display buffer beyond the edge of the first contiguous data subset through circular addressing of the display buffer, wherein the display buffer cache stores a plurality of pixels, each of the plurality of pixels having a pixel address within the two dimensional circular buffer, wherein each pixel is characterized by a linear segment position and a linear segment number within the linear buffer memory, and wherein the two dimensional circular buffer is characterized by a linear segment length and a data buffer size, wherein a current pixel is access by:

calculating a linear segment offset within the two dimensional circular buffer by multiplying a linear segment number of the current pixel by the linear segment length;

adding a two dimensional circular buffer starting data address, modulo the data buffer size, to a current linear segment position of the current pixel, and adding that sum to the linear segment offset; and reducing a magnitude of the linear segment offset by the data buffer size if the magnitude of the linear segment offset is greater than the data buffer size.

15. The device according to claim 14, wherein the device incorporating a video display is one of a digital camera, video camera and a digital image file viewer.

16. The device according to claim 14, wherein the device incorporating a video display is one of a personal computing device, a wireless communications device and a digital communications device.

17. The device according to claim 14, wherein the linear segment offset is one of a positive value and a negative value.

18. The device according to claim 14, wherein the device incorporating a video display is one of a digital camera, video camera and a digital image file viewer.

19. A computer program product for buffering a subset of digital image data used to drive a scrolling display, the computer program product configured to perform the steps of:

storing a first contiguous data subset of a complete set of digital image data into a linear buffer memory, the data subset being greater than an amount of data accessed by a display and the buffer memory being organized as a two dimensional circular buffer;

determining if a display buffer within the first contiguous data subset is within a threshold distance of an edge of data forming the first contiguous data subset;

identifying an additional subset of the complete set of digital image data to place into the buffer memory, wherein the additional subset is image data that is contiguous with the first contiguous data and wherein the additional subset of data extends beyond the edge of the first contiguous data subset; and loading the additional subset of data into the display buffer beyond the edge of the first contiguous data subset through circular addressing of the display buffer, wherein the buffer memory stored a plurality of pixels, each of the plurality of pixels having a pixel address within the buffer memory, wherein each pixel is characterized by a linear segment position and a linear segment number, and wherein the buffer memory is characterized by a linear segment length and a data buffer size, wherein each pixel is access by:

calculating a linear segment offset within the buffer memory by multiplying a linear segment number of a current pixel by the linear segment length;

adding a buffer memory starting data address, modulo the data buffer size, to a current linear segment position of the current pixel, and adding that sum to the linear segment offset; and reducing a magnitude of the linear segment offset by the data buffer size if the magnitude of the linear segment offset is greater than the data buffer size.

20. The computer program product according to claim 19, wherein the loading the additional subset of data comprises progressively loading the additional subset of the complete set of digital image data into the buffer.

21. The computer program product, according to claim 19, wherein the linear segment offset is one of a positive value and a negative value.

22. A system for buffering a subset of digital image data used to drive a scrolling display, comprising:

a display buffer cache for storing a first contiguous data subset of a complete set of digital image data, the data subset being greater than an amount of data accessed by a display and the display buffer cache being organized as a two dimensional circular buffer, wherein the display buffer cache stores a plurality of pixels, each of the plurality of pixels having a pixel address within the two dimensional circular buffer, wherein each pixel is characterized by a linear segment position and a linear segment number, and wherein the two dimensional circular buffer is characterized by a linear segment length and a data buffer size, wherein a current pixel is access by:

calculating a linear segment offset within the two dimensional circular buffer by multiplying a linear segment number of the current pixel by the linear segment length;

adding a two dimensional circular buffer starting data address, modulo the data buffer size, to a current linear segment position of the current pixel, and adding that sum to the linear segment offset; and reducing a magnitude of the linear segment by the data buffer size if the magnitude of the linear segment offset is greater than the data buffer size.

* * * * *